United States Patent [19]

Kyoto et al.

[11] Patent Number: 4,655,808
[45] Date of Patent: Apr. 7, 1987

[54] METHOD FOR PRODUCING GLASS PREFORM FOR OPTICAL FIBER

[75] Inventors: Michihisa Kyoto; Yoichi Ishiguro; Hiroshi Kawauchi; Gotaro Tanaka, all of Yokohama, Japan

[73] Assignee: Sumitomo Electric Industries, Ltd., Osaka, Japan

[21] Appl. No.: 748,560

[22] Filed: Jun. 25, 1985

[30] Foreign Application Priority Data

Aug. 17, 1984 [JP] Japan .................................. 59-170469

[51] Int. Cl.$^4$ ...................... C03C 25/02; C03B 37/075
[52] U.S. Cl. .......................................... 65/3.12; 65/13; 65/18.2; 65/32
[58] Field of Search ................. 65/2, 3.12, 30.12, 18.2, 65/31, 32, 13

[56] References Cited

U.S. PATENT DOCUMENTS

| | | | |
|---|---|---|---|
| 4,304,583 | 12/1981 | Aronson et al. | 65/3.12 X |
| 4,367,085 | 1/1983 | Suto et al. | 65/3.12 X |
| 4,378,985 | 4/1983 | Powers | 65/13 X |
| 4,552,576 | 11/1985 | Hara et al. | 65/2 |

Primary Examiner—Robert Lindsay
Attorney, Agent, or Firm—Cushman, Darby & Cushman

[57] ABSTRACT

A method for producing a glass preform comprising flame hydrolyzing a glass raw material in an oxyhydrogen flame to form glass fine particles of quartz, depositing the glass fine particles on a seed member to produce a solid or hollow cylindrical soot preform at least of a part of which contains GeO$_2$, and heating and sintering the soot preform by introducing it in an atmosphere comprising an inert gas at least a part of which is kept at a temperature not lower than 1,600° C. at an introducing rate not smaller than 3 mm/min, from the glass preform produced by which method, an optical fiber having longitudinally homogeneous composition and low attenuation of light transmission is fabricated.

7 Claims, 4 Drawing Figures

METHOD FOR PRODUCING GLASS PREFORM FOR OPTICAL FIBER

FIELD OF THE INVENTION

The present invention relates to a method for producing a glass preform for use in the fabrication of an optical fiber. More particularly, it relates to a method for producing a glass preform for use in the fabrication of an optical fiber which is longitudinally homogeneous and has low attenuation of light transmission.

BACKGROUND OF THE INVENTION

Methods suitable for mass production of a glass preform for use in the fabrication of an optical fiber includes a vapor phase axial deposition method (hereinafter referred to as a "VAD" method and an outside vapor phase deposition method (hereinafter referred to as a "OVPD" method). These deposition methods comprise flame hydrolyzing a glass raw material in an oxyhydrogen flame to form glass fine particles of pure quartz ($SiO_2$) or quartz added containing an additive such as $GeO_2$ having an average particle size of about 0.1 micrometer, depositing the glass fine particles on a seed member to produce a porous soot preform and sintering the soot preform at a high temperature to obtain a transparent glass preform. According to the VAD method, the glass fine particles are deposited on the rotating seed member in parallel with the rotating axis of the member to continuously form the solid cylindrical soot preform (cf. U.S. Pat. No. 4,135,901). According to the OVPD method, the glass fine particles are deposited on a rotating rod member made of alumina or quartz glass from a direction perpendicular to the rotating axis of the member to form multiple layers of the glass fine particles (cf. U.S. Pat. Nos. 3,711,262, 3,737,292 and 3,737,293). The produced porous soot preform is then heated and sintered in an atmosphere of an inert gas such as helium at a high temperature to make the soot preform transparent to obtain the glass preform. Generally, the porous soot preform contains an additive for adjusting refractive index of the soot preform such as $GeO_2$. The additive, however, volatilizes from the preform at a high temperature since it is thermally volatile. Therefore, the refractive index adjusted during the production of the soot preform is unacceptably changed due to partial or complete volatilization of the additive during sintering.

To prevent the volatilization of the additive, it is proposed to heat the soot preform at a temperature at least 200° C. higher than the lowest temperature required for making it transparent but not higher than 1,600° C. (cf. Japanese Patent Publication No. 3981/1983).

However, the method disclosed in the Japanese Patent Publication has some drawbacks such that an optical fiber fabricated from the glass preform produced by this method has poor light transmission characteristics, for example, great increase of attenuation of light transmission since the glass preform is produced at a comparatively low temperature. For instance, when a soot preform consisting of glass fine particles of $SiO_2$ containing 25% by weight of $GeO_2$ is sintered at 1,350° C. which is 75° C. higher than the lowest sintering temperature to produce a transparent glass preform, an optical fiber fabricated form the glass preform has attenuation of 10 to 20 dB/km at a wavelength of 0.85 micrometer, which is far larger than theoretical critical upper value of about 3 dB/km. This increased attenuation of light transmission is found to be caused by structural defects of the glass preform due to the presence of $Ge^{2+}$.

In addition, when the above optical fiber is kept at 200° C., hydrogen, which is present in the fiber, migrated from a covering material of the fiber and/or in air, diffuses to and reacts with the $Ge^{2+}$ sites, namely, the structural defects to form GeOH as follows:

$$Ge^{2+} + \tfrac{1}{2}H_2 \rightarrow GeOH \qquad (I)$$

which leads to increase of residual hydroxyl groups. It is well known that hydrogen easily permeates through a glass material.

Since absorption due to the residual hydroxyl groups has a peak near a wavelength of 1.39 micrometer, it influences light transmission in a wavelength band of 1.30 micrometer which is used in telecommunication and increases the absorption at a wavelength of 1.30 micrometer. Since acceptable increase of attenuation of light transmission in this wavelength band is 1.0 dB/km or less, increase of attenuation by 0.2 dB/km with the passage of time is said to have great adverse effect on communication systems.

The structural defects due to the presence of $Ge^{2+}$ in the optical fiber not only deteriorate the light transmission characteristics of the optical fiber but also increase the amount of the residual hydroxyl groups which influence the long-term reliability of the optical fiber. Therefore, it is highly desired to provide a method for producing a glass preform for used in the fabrication of an optical fiber which does no suffer adverse effect of $Ge^{2+}$.

SUMMARY OF THE INVENTION

One object of the present invention is to provide a method for producing a glass preform having less structural defects due to $Ge^{2+}$ than one produced by the conventional method.

Another object of the present invention is to provide a method for producing a glass preform, from which an optical fiber having a homogeneous composition in its longitudinal direction and low attenuation of light transmission.

Accordingly, the present invention provides a method for producing a glass preform comprising flame hydrolyzing a glass raw material in an oxyhydrogen flame to form glass fine particles of quartz, depositing the glass fine particles on a seed member to produce a solid or hollow cylindrical soot preform at least of a part of which contains $GeO_2$, and heating and sintering the soot preform by introducing it in an atmosphere comprising an inert gas such as helium at least a part of which is kept at a temperature not lower than 1,600° C. at an introducing rate not smaller than 3 mm/min.

At lease a part of the soot preform contains $GeO_2$ in such an amount that it contribute to generate graduation of refractive index in the preform.

DETAILED DESCRIPTION OF THE INVENTION

Relationship between amount of $GeO_2$ added and amount of structural defects due to $Ge^{2+}$ In order to find a relationship between the amount of $GeO_2$ added to quartz glass and the amount of the structural defects due to $Ge^{2+}$, four kinds of the soot preforms of $SiO_2$-$GeO_2$ glass containing $GeO_2$ in various amounts are produced by the VAD method.

The soot preforms are heated in an atmosphere of pure helium from 800° C. to 1,500° C. at a raising rate of 3.3° C./min. to produce glass preforms (Nos. 1 to 4). The $GeO_2$ concentration in the glass preform and the refractive index difference ($\Delta n$) are shown in Table 1 and UV spectra of the four kinds of glass are shown in FIG. 1.

TABLE 1

| No. | Glass composition | $\Delta n$ (%) | $GeO_2$ (wt. %) |
|---|---|---|---|
| 1 | $SiO_2$ | — | — |
| 2 | $SiO_2$—$GeO_2$ | 0.5 | 8.5 |
| 3 | $SiO_2$—$GeO_2$ | 1.0 | 17 |
| 4 | $SiO_2$—$GeO_2$ | 1.6 | 27 |

Figure 1:
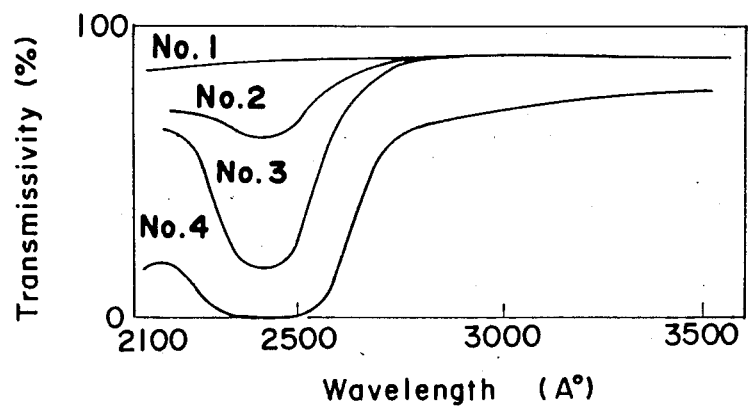
FIG. 1 is UV spectra of four kinds of glass in Table 1.

As is seen from FIG. 1, the higher the $GeO_2$ content, the greater the absorption at a wavelength of 2,450 Å. Since such absorption is not found in pure quartz, it is due to the presence of $GeO_2$ and absorption in UV range is said to be caused by the structural defects. Corresponding to the absorption at a wavelength of 2,450 Å, absorption appears at wavelengths of 0.45 and 0.63 micrometers, influence of which, namely increase of absorption due to tailing appears in a wavelength range of 0.80 to 1.60 micrometer. Needless to say, it is important to minimize the absorption in this range for the optical fiber to be used in communication.

Thermal volatilization of $GeO_2$

By the VAD method, a soot preform of glass fine particles of $SiO_2$-$GeO_2$ glass (weight ratio of $SiO_2$ and $GeO_2$ = 90:10) is produced and heated in an atmosphere of pure helium at 1,200° C. for 3 hours. The preform shrinks by about 30% in its radial direction. The glass composition after heating is 94% by weight of $SiO_2$ and 6% by weight of $GeO_2$. This change of the composition is caused by the volatilization of $GeO_2$, which may proceed according to the following equation:

$$GeO_2 \rightarrow GeO\ (g) + \tfrac{1}{2}O_2 \qquad (II)$$

wherein (g) stands for a gas state. It is known that GeO is sublimated at a temperature not lower than 800° C.

Figure 2:
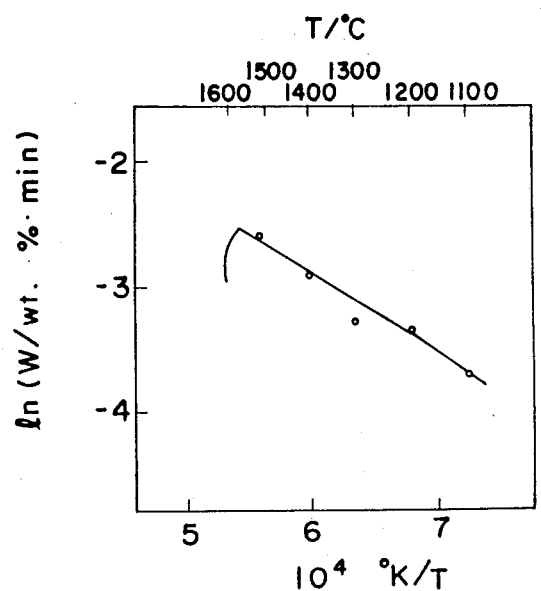
FIG. 2 is a graph showing the dependency of the volatilized amount of $GeO_2$ on temperature, FIG. 3 schematically shows a furnace used in EXAMPLES for sintering the soot preforms.

The study of dependency of the thermal volatilization of $GeO_2$ on temperature according the above equation (II) reveals that there exists a relationship between the volatilization rate of $GeO_2$ from the soot preform (W wt. %/min.) and absolute temperature T° K. as shown in FIG. 2, which relationship is expressed by the following equation:

$$W = 2.9 \times \exp(-Ea/RT) \qquad (III)$$

wherein R is 1.987 cal/deg.mole and Ea=12.0 kcal/mole (cf. 8th Conference of Optical Communication (CANNES), C-15, 629-632 (1982)).

As understood from the equation (III), the thermal volatilization rate of $GeO_2$ depends on temperature and increases as temperature raises.

It is found that when the same soot preform as described above (glass composition being 90% by weight of $SiO_2$ and 10% by weight of $GeO_2$ is heated in an atmosphere of pure helium at 1,700° C., it is converted to a transparent glass preform within 5 minutes, and the obtained glass preform contains 9.5% by weight of $GeO_2$. This result means that $GeO_2$ is substantially not volatilized, and seems to be inconsistent with the above equation. However, this phenomenon is explained as follows:

Although the volatilization rate of $GeO_2$ at 1,200° C. is small, the soot preform slowly shrinks, for example, after 3 hours, its shrinks at most by 30% in its radial direction and the glass particles still have considerably large specific surface area (g/cm³). in addition, $GeO_2$ volatilizes from the surface of the particles. Accordingly, a volatilized amount of $GeO_2$ ($V_{GeO}$) is proportional to the product of the sintering temperature, the specific surface area (S) and sintering time (t) and expressed as follows:

$$V_{GeO} \propto S \times t \times \exp(-Ea/RT) \qquad (IV)$$

wherein Ea and R are the same as defined above. From this relationship, it is understood that even if the volatilization rate expressed by the equation (III) is small, the volatilized amount of $GeO_2$ increases as the soot preform is heated while the specific surface area is large.

On the contrary, when heated at 1,700° C., although the volatilization rate is 3 to 4 times larger than at 1,200° C., the soot preform very quickly shrinks and the period in which $GeO_2$ volatilizes is shortened to less than 5 minutes, which is one thirty-sixth (1/36) of the shrinking period at 1,200° C. Thus, the volatilized amount is only about one tenth (3-4×1/36). This means that the volatilization of $GeO_2$ is more effectively prevented by sintering the soot preform at a temperature at which it quickly shrinks.

Structural defects due to $GeO_2$ and sintering temperature

Two soot preforms consisting of 75% by weight of $SiO_2$ and 25% by weight of $GeO_2$ are produced by VAD method and sintered in an atmosphere of pure helium at 1,375° C. or 1,650° C. to obtain two transparent glass preforms. UV spectra of the glass preforms show that one sintered at a lower temperature has more defects than one sintered at a higher temperature, and it is estimated from ratio of absorption at a wavelength of 2,450 Å that the former has ten times more defects than the latter.

This means that the generation of the structural defects closely, relates to the volatilization of $GeO_2$, which may be interpreted as follows:

As GeO is formed according to the equation (II) and remains in the glass preform, the $Ge^{2+}$ content in the preform increases. The reason for this may be that, since the GeO molecule is more bulky than the oxygen molecule so that the diffusion of the former is more difficult than the latter, the concentration of the former becomes larger than that of the latter, which prevents the reverse reaction of the equation (I) ($Ge^{2+}+(GeO)\rightarrow Ge^{4+}$-($GeO_2$)).

Thus, it is understood that the suppression of the volatilization of $GeO_2$ is essential to decrease the defects due to $Ge^{2+}$.

From the above fundamental discussions, it is understood that the sintering conditions, particularly the sintering temperature and its hysteresis play an important role in producing a glass preform having less defects.

According to the present invention, the sintering temperature is preferably from 1,600° to 2,000° C. At a temperature higher than 1,600° C., the volatilization of $GeO_2$ is prevented by the shrinkage of the soot preform and the preform is made transparent. At a temperature higher than 2,000° C., the transparent glass preform is thinly extended to make its diameter irregular.

Preferably, the soot preform is introduced in the sintering atmosphere at a rate of 3 to 20 mm/min. When the introducing rate is larger than 20 mm/min., bubbles tends to remain in the preform, and heat is not conducted to the central portion of the preform so that said portion remains semitransparent, which is caused by micro-bubbles and cause bubbling when drawing the optical fiber from the glass preform.

The content of $GeO_2$ in the quartz glass is preferably from 15 to 80% by weight.

In the method of the present invention, before sintering, the soot preform may be dehydrated in an atmosphere of an inert gas containing a chlorine-containing compound (eg. $Cl_2$, $SOCl_2$, $COCl_2$, $CCl_4$, etc.) by a per se conventional method.

The present invention will be hereinafter explained further in detail by following Examples.

Figure 3:
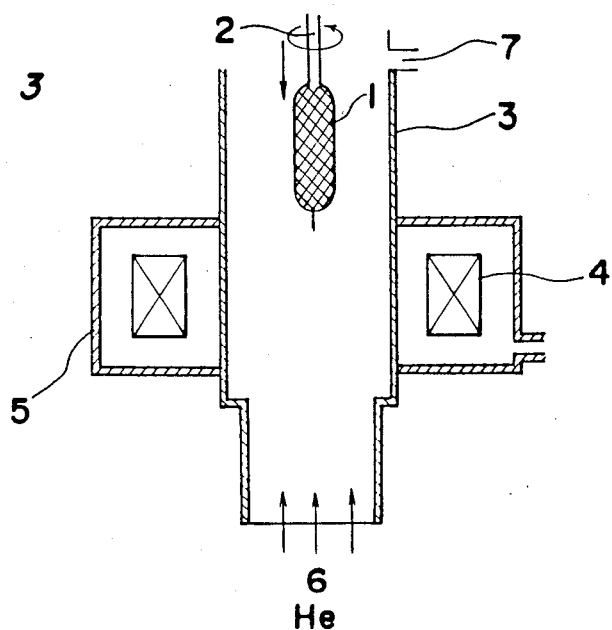

In Examples, the soot preform was heated and sintered by means of a furnace shown in FIG. 3, in which numerals 1, 2, 3, 4, 5, 6 and 7 represent a soot preform, a supporting rod, a muffle tube, a heater, a furnace body, an inlet for introducing atmospheric gas and an outlet, respectively. tively.

EXAMPLES 1 (1)–(17)

Seventeen soot preforms of quartz glass consisting of 75% by weight of $SiO_2$ and 25% by weight of $GeO_2$ were produced by the VAD method. Each soot preform was introduced at a predetermined rate (mm/min.) in the furnace kept at a predetermined temperature with temperature gradient of 45° C./cm in a temperature range higher than 1,000° C. to make it transparent. An atmosphere was pure helium.

Figure 4:
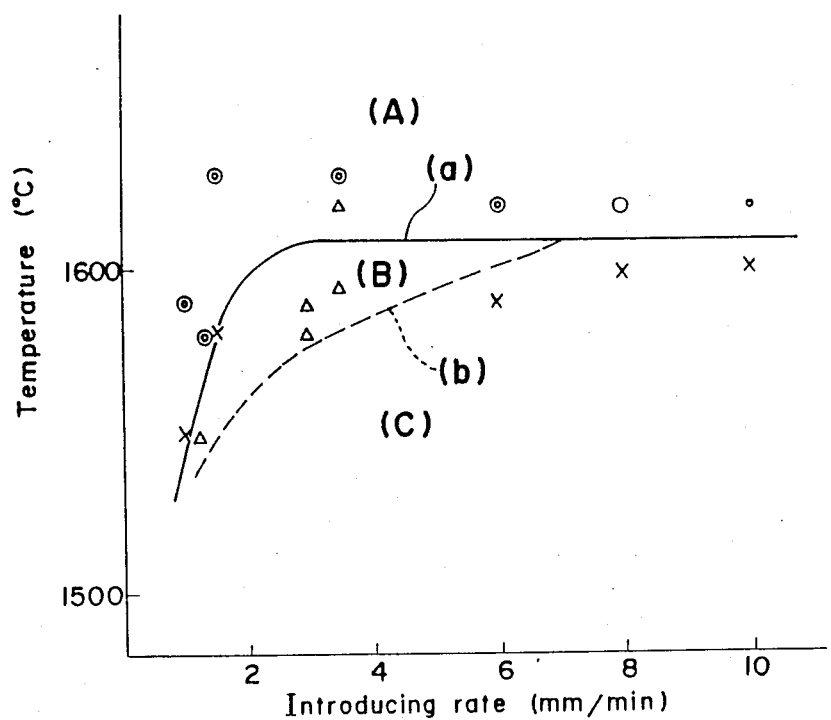
FIG. 4 shows the relationship among the appearance of the glass preforms produced in EXAMPLE 1 and the sintering temperature and the introducing rate of the soot proform.

FIG. 4 shows relationship among the appearance of the produced glass preform and the sintering temperature and the introducing rate of the soot preform. In FIG. 4, a double circle, a triangle and a cross stand for "Completely transparent", "Almost transparent" and "Semitransparent", respectively, and the solid line (a) and the broken line (b) represent a lower limit for producing a completely transparent glass preform and a lower limit for producing an almost transparent one, respectively. The regions A, B and C represent regions in which a completely transparent, almost transparent and semitransparent glass preform are produced, respectively.

From these results, it is seen that the soot preform is preferably sintered at a temperature not lower than 1,610° C. when it is introduced at a rate larger than 3 mm/min. When the soot preform is introduced at a rate smaller than 2 mm/min., it must be sintered at a temperature not lower than 1,580° C., otherwise a semitransparent preform is obtained.

An optical fiber fabricated from the completely transparent glass preform contained few bubble, while one fabricated from the semitransparent glass preform included many bubbles.

From the glass preform produced by introducing it at a rate larger than 3 mm/min., fabricated was an optical fiber having attenuation of light transmission in a range between 3 and 4 dB/km at a wavelength of 0.85 micrometer, while from the glass preform produced by introducing it at a rate not larger than 2 mm/min., fabricated was an optical fiber having attenuation of light transmission in a range between 10 and 20 dB/km at the same wavelength.

EXAMPLE 2

In the same manner as in EXAMPLE 1 but introducing it in the furnace kept at 1,750° C. at a rate of 15 mm/min., the same soot preform as used in EXAMPLE 1 was sintered to obtain a glass preform in the central portion of which contained many bubbles.

EXAMPLE 3

In the same manner as in EXAMPLE 2 but introducing it in the furnace at a rate of 5 mm/min., the soot preform was sintered to obtain a completely transparent glass preform without bubble. An optical fiber fabricated from the glass preform had attenuation of light transmission not higher than 3 dB/km at a wavelength of 0.85 micrometer.

EXAMPLE 4

A soot preform of quartz glass containing 15% by weight of $GeO_2$ was sintered in the same manner as in EXAMPLE 1. At an introducing rate larger than 3 mm/min. at a temperature higher than 1,600° C., a completely transparent glass preform was obtained. An optical fiber fabricated from the glass preform had attenuation of light transmission of 2.3 to 2.8 dB/km at a wavelength of 0.85 micrometer.

EXAMPLE 5

In the same manner as in EXAMPLE 4 but introducing it at a rate of 1 mm/min. in the furnace kept at 1,500° C., a soot preform was sintered to obtain a glass preform. From this, an optical fiber with attenuation of light transmission of 4 to 5 dB/km at a wavelength of 0.85 micrometer was fabricated. This means that the attenuation was deteriorated by about 2 dB/km due to the absorption by $Ge^{2+}$.

EXAMPLE 6

Before sintering, the soot preform was dehydrated in an atmosphere of helium containing 5% by volume of chlorine at a temperature of 1100° C. Then, it was sintered in the same manner as in EXAMPLE 4. Substantially the same glass preform and optical fiber were produced. The content of the residual hydroxyl groups was less than 0.1 ppm.

EXAMPLE 7

The same soot preform as used in EXAMPLE 1 was sintered by introducing it at a rate of 3 mm/min. in the furnace kept at 1,600° C. with temperature gradient of 20° C./cm or 65° C./cm to obtain a completely transparent glass preform. In an optical fiber fabricated from this glass preform, absorption by $Ge^{2+}$ did not increase attenuation of light transmission at a wavelength of 0.85 micrometer.

This result means that when the soot preform is sintered at a temperature higher than 1,600° C. with temperature gradient of 20° to 65° C./cm at an introducing rate larger than 3 mm/min., the produced glass preform does not include any bubble, and absorption due to $Ge^{2+}$ can be reduced.

EXAMPLE 8

In the same manner as in EXAMPLE 7, a soot preform produced by the OVPD method was sintered. The results were substantially the same as in EXAMPLE 7.

The results of above EXAMPLES are summarized in following Table 2.

heating and sintering the soot preform by introducing it in an atmosphere comprising an inert gas at least a part of which is kept at a temperature not lower than 1,600° C. at an introducing rate not smaller than 3 mm/min.

2. A method according to claim 1, wherein the sintering temperature is from 1,600° to 2,000° C.

3. A method according to claim 1, wherein the introducing rate is from 3 to 20 mm/min.

TABLE 2

| EXAMPLE No. | Glass composition $SiO_2$ | Glass composition $GeO_2$ | Temperature gradient (°C./cm) | Introducing rate (mm/min.) | Temp. (°C.) | Appearance of glass preform | Attenuation*1 of optical fiber | Condition of optical fiber |
|---|---|---|---|---|---|---|---|---|
| 1 (1)  | 75 | 25 | 45 | 1    | 1,550 | Semi*2    | —            | Bubbles       |
| 1 (2)  | 75 | 25 | 45 | 1    | 1,590 | Almost*3  | —            | Bubbles       |
| 1 (3)  | 75 | 25 | 45 | 1.25 | 1,580 | Semi*2    | —            | Bubbles       |
| 1 (4)  | 75 | 25 | 45 | 1.25 | 1,630 | Comp.*4   | Less than 3  | No Bubble     |
| 1 (5)  | 75 | 25 | 45 | 3    | 1,580 | Almost*3  | —            | Bubbles       |
| 1 (6)  | 75 | 25 | 45 | 3    | 1,590 | Almost*3  | About 5      | A few bubbles |
| 1 (7)  | 75 | 25 | 45 | 3.5  | 1,595 | Almost*3  | 4            | No bubble     |
| 1 (8)  | 75 | 25 | 45 | 3.5  | 1,620 | Almost*3  | 3–3.5        | No bubble     |
| 1 (9)  | 75 | 25 | 45 | 3.5  | 1,630 | Comp.*4   | Less than 3  | No bubble     |
| 1 (10) | 75 | 25 | 45 | 6    | 1,590 | Semi*2    | —            | Bubbles       |
| 1 (11) | 75 | 25 | 45 | 6    | 1,620 | Comp.*4   | Less than 3  | No bubble     |
| 1 (12) | 75 | 25 | 45 | 8    | 1,600 | Semi*2    | About 5      | Bubbles       |
| 1 (13) | 75 | 25 | 45 | 8    | 1,620 | Comp.*4   | Less than 3  | No bubble     |
| 1 (14) | 75 | 25 | 45 | 10   | 1,600 | Semi*2    | —            | Bubbles       |
| 1 (15) | 75 | 25 | 45 | 10   | 1,620 | Comp.*4   | Less than 3  | No bubble     |
| 1 (16) | 75 | 25 | 45 | 1.5  | 1,580 | Semi*2    | 4–5          | Note*5        |
| 1 (17) | 75 | 25 | 45 | 1.5  | 1,630 | Comp.*4   | Less than 3  | No bubble     |
| 2      | 75 | 25 | 45 | 15   | 1,750 | Semi*2    | —            | Bubbles       |
| 3      | 75 | 25 | 45 | 5    | 1,750 | Comp.*4   | Less than 3  | No Bubble     |
| 4      | 85 | 15 | 45 | >3   | 1,600 | Comp.*4   | 2.3–2.8      | No bubble     |
| 5      | 85 | 15 | 45 | 1    | 1,500 | Semi*2    | 4–5          | Note*5        |
| 6      | 85 | 15 | 45 | >3   | 1,600 | Comp.*4   | 2.3–2.8*6    | Note*7        |
| 7      | 75 | 25 | 20 | 3    | 1,600 | Comp.*4   | Less than 3*6 | Note*8       |
|        | 75 | 25 | 65 | 3    | 1,600 | Comp.*4   | Less than 3*6 | Note*8       |
| 8      | 75 | 25 | 20 | 3    | 1,600 | Comp.*4   | Less than 3*6 | Note*8       |
|        | 75 | 25 | 65 | 3    | 1,600 | Comp.*4   | Less than 3*6 | Note*8       |

Note:
*1 Attenuation at a wavelength of 0.85 micrometer.
*2 Semitransparent.
*3 Almost transparent.
*4 Completely transparent.
*5 Attenuation of light transmission increased by about 2 dB/km due to $Ge^{2+}$.
*6 Residual hydroxyl groups less than 0.1 ppm.
*7 Before sintering, the soot preform was dehydrated with chlorine.
*8 No increase of attenuation of light transmission due to $Ge^{2+}$.

What is claimed is:

1. A method for producing a glass preform comprising
   flame hydrolyzing a glass raw material in an oxyhydrogen flame to form glass fine particles of quartz,
   depositing the glass fine particles on a seed member to produce a solid or hollow cylindrical soot preform at least a part of which contains at least 15% by weight $GeO_2$, and 4. A method according to to claim 1, wherein the amount of $GeO_2$ is from 15 to 80% by weight.

5. A method according to claim 1, wherein the inert gas is helium.

6. A method according to claim 1, which further comprises dehydrating the soot preform before sintering it.

7. A method according to claim 6, wherein the soot preform is dehydrated in an atmosphere comprising an inert gas and a chlorine-containing compound.

* * * * *